(12) United States Patent
Joh et al.

(10) Patent No.: US 8,834,609 B2
(45) Date of Patent: Sep. 16, 2014

(54) METHOD AND DEVICE FOR SEPARATING CARBON DIOXIDE FROM A WASTE GAS OF A FOSSIL FUEL-OPERATED POWER PLANT

(75) Inventors: Ralph Joh, Seligenstadt (DE); Rüdiger Schneider, Eppstein (DE); Henning Schramm, Frankfurt am Main (DE)

(73) Assignee: Siemens Aktiengesellschaft, Munich (DE)

( * ) Notice: Subject to any disclaimer, the term of this patent is extended or adjusted under 35 U.S.C. 154(b) by 585 days.

(21) Appl. No.: 13/003,805

(22) PCT Filed: May 14, 2009

(86) PCT No.: PCT/EP2009/055792
§ 371 (c)(1),
(2), (4) Date: Jan. 12, 2011

(87) PCT Pub. No.: WO2010/006825
PCT Pub. Date: Jan. 21, 2010

(65) Prior Publication Data
US 2011/0139003 A1    Jun. 16, 2011

(30) Foreign Application Priority Data
Jul. 17, 2008   (EP) .................................... 08012961

(51) Int. Cl.
| | | |
|---|---|---|
| B01D 53/14 | (2006.01) | |
| F23J 15/04 | (2006.01) | |
| F23J 15/00 | (2006.01) | |
| F22B 37/00 | (2006.01) | |

(52) U.S. Cl.
CPC ........... *F23J 15/04* (2013.01); *B01D 2257/504* (2013.01); *F23J 2219/40* (2013.01); *Y02C 10/06* (2013.01); *F23J 2215/50* (2013.01); *B01D 53/1425* (2013.01); *F23J 15/006* (2013.01); *F22B 37/008* (2013.01); *Y02C 10/04* (2013.01); *F23J 2215/20* (2013.01); *B01D 53/1475* (2013.01)
USPC ................... 95/165; 95/166; 95/168; 95/183; 95/193; 95/209; 95/236

(58) Field of Classification Search
None
See application file for complete search history.

(56) References Cited

U.S. PATENT DOCUMENTS

| | | | |
|---|---|---|---|
| 4,528,811 | A | 7/1985 | Stahl |
| 4,702,898 | A | 10/1987 | Grover |

(Continued)

FOREIGN PATENT DOCUMENTS

| | | |
|---|---|---|
| CN | 87105896 A | 5/1988 |
| EP | 1552874 | 7/2005 |

(Continued)

*Primary Examiner* — Duane Smith
*Assistant Examiner* — Pankti Patel

(57) ABSTRACT

A method for separating carbon dioxide from a flue gas of a fossil fuel-operated power plant is provided. In the method, a fossil fuel is initially burned in a combustion process, wherein a hot waste gas containing carbon dioxide is produced. In a next process step, waste gas containing carbon dioxide is brought into contact with an absorption medium in an absorption process, wherein carbon dioxide is absorbed by the absorption medium, thus forming a charged absorption medium. Next, gaseous carbon dioxide is thermally expelled from the charged absorption medium in a desorption process. For this purpose, a vapor is supplied to the desorption process, the vapor is injected into the charged absorption medium, wherein the condensation heat released by the condensation of the vapor is transferred to the charged absorption medium, and the partial pressure of the carbon dioxide is simultaneously reduced in the desorption unit.

5 Claims, 3 Drawing Sheets

(56) References Cited

U.S. PATENT DOCUMENTS

| | | | |
|---|---|---|---|
| 8,062,408 B2* | 11/2011 | Chen et al. | 95/163 |
| 2007/0148068 A1 | 6/2007 | Burgers et al. | |
| 2008/0060346 A1* | 3/2008 | Asen et al. | 60/274 |
| 2008/0317651 A1* | 12/2008 | Hooper et al. | 423/230 |
| 2009/0205946 A1* | 8/2009 | Reddy et al. | 203/75 |
| 2009/0317315 A1* | 12/2009 | Hustad et al. | 423/230 |
| 2010/0005966 A1* | 1/2010 | Wibberley | 95/179 |
| 2010/0229723 A1* | 9/2010 | Gelowitz et al. | 95/162 |

FOREIGN PATENT DOCUMENTS

| | | |
|---|---|---|
| EP | 1688173 | 8/2006 |
| JP | 60040733 A | 3/1985 |
| JP | H0751537 A | 2/1995 |
| JP | 2006213580 A | 8/2006 |
| JP | 2008023438 A | 2/2008 |
| JP | 2008029976 | 2/2008 |
| RU | 2090247 C1 | 9/1997 |
| SU | 1754182 A1 | 8/1992 |
| WO | WO 2005045316 | 5/2005 |

* cited by examiner

METHOD AND DEVICE FOR SEPARATING CARBON DIOXIDE FROM A WASTE GAS OF A FOSSIL FUEL-OPERATED POWER PLANT

CROSS REFERENCE TO RELATED APPLICATIONS

This application is the US National Stage of International Application No. PCT/EP 2009/055792, filed May 14, 2009 and claims the benefit thereof. The International Application claims the benefits of European Patent Office application No. 08012961.2 EP filed Jul. 17, 2008. All of the applications are incorporated by reference herein in their entirety.

FIELD OF INVENTION

The invention relates to a method for operation of a fossil-fueled power station, and in particular to a method for separation of carbon dioxide from an off-gas of a fossil-fueled power station. The invention also relates to a fossil-fueled power station having a separation device for separation of carbon dioxide from an off-gas.

BACKGROUND OF INVENTION

In the case of fossil-fueled power stations for generation of electrical energy on a large scale, a large amount of off-gas, which contains carbon dioxide, is produced by the combustion of a fossil fuel. In addition to carbon dioxide, the off-gas contains further components, such as the gases nitrogen, sulfur dioxide, nitrogen oxides and steam, as well as solid particles, dusts and soot. In relatively modern or modernized power stations, the solid components are already separated, the sulfur oxides are already separated, and the nitrogen oxides are already removed catalytically. Until now, the carbon dioxide contained in the off-gas has been allowed to escape with the off-gas into the atmosphere. The carbon dioxide accumulating in the atmosphere is preventing heat from being radiated from our planet and, as a result of the so-called greenhouse effect, is promoting an increase in the surface temperature of our planet. Carbon dioxide can be separated from the off-gas, in order to achieve a reduction in the carbon-dioxide emission from fossil-fueled power stations.

Various methods are known for separation of carbon dioxide from a gas mixture, in particular from the chemical industry. The absorption/desorption method is known in particular for separation of carbon dioxide from an off-gas following a combustion process (post-combustion $CO_2$ separation).

The separation of carbon dioxide using the absorption/desorption method is carried out using a washing agent. In a traditional absorption/desorption process, the off-gas is brought into contact with a selective solvent, as the washing agent, in an absorption column. In this case, the carbon dioxide is absorbed by means of a chemical or physical process. The cleaned off-gas leaves the absorption column for further processing or extraction. The solvent loaded with carbon dioxide is passed into a desorption column in order to separate the carbon dioxide and to regenerate the solvent. The separation process in the desorption column can be carried out thermally. In this case, a gas/vapor mixture composed of gaseous carbon dioxide and vaporized solvent is forced out of the loaded solvent. The vaporized solvent is then separated from the gaseous carbon dioxide. The carbon dioxide can now be compressed, cooled and liquefied in a plurality of stages. The carbon dioxide can then be supplied to a storage depot or for further use, in the liquid or frozen state. The regenerated solvent is passed back to the absorber column, where it can once again absorb carbon dioxide from the off-gas which contains carbon dioxide.

The main problem with the existing methods for separation of carbon dioxide from a gas mixture on a large scale is, in particular, very high energy consumption which, inter alia, is required in the form of heat energy for the desorption process.

One general disadvantage of known separation processes for carbon dioxide from an off-gas, with these processes being connected in or after a power-station process, is, in particular, the influence of the separation method on the power-station process, since it makes the efficiency considerably worse. The deterioration in the efficiency occurs because the energy for carrying out the carbon-dioxide separation process must be taken from the power-station process. The efficiency of a fossil-fueled power station with a carbon-dioxide separation apparatus is therefore considerably lower than that of one without a carbon-dioxide separation apparatus.

SUMMARY OF INVENTION

One object of the invention is to propose a method for separation of carbon dioxide from an off-gas of a fossil-fueled power station, which allows high separation efficiency with a good overall installation efficiency for the power-station process, at the same time.

A further object of the invention is to propose a fossil-fueled power station having an integrated separation device for carbon dioxide, which allows high separation efficiency with a good overall efficiency of the power station at the same time.

The object relating to a method is achieved according to the invention by a method for separation of carbon dioxide from an off-gas of a fossil-fueled power station in which a fossil fuel is burnt in a combustion process, with a hot off-gas containing carbon dioxide being produced, in which off-gas containing carbon dioxide is brought into contact with an absorption medium in an absorption process, with carbon dioxide being absorbed by the absorption medium and with a loaded absorption medium being formed, in which carbon dioxide is thermally forced out of the loaded absorption medium in a desorption process, and in which a steam is supplied, which is injected into the loaded absorption medium, with the condensation heat released by condensation of the steam being transferred to the loaded absorption medium.

The invention is in this case based on the idea that the condensation heat which is introduced directly into the loaded absorption medium contributes significantly to thermally forcing out the carbon dioxide. According to the invention, in this case, the steam is introduced into the desorption process.

The use of the condensation heat of the steam in order to assist the desorption process reduces the load on the heating device in the desorption process. The steam is condensed within the column, as a result of which the condensation heat is transferred directly to the loaded absorption medium. A low-temperature steam can therefore be used, since no losses occur as a result of a heat transfer, for example as in the case of an indirect heat transfer in a heat-exchanger process.

Since a steam at a lower pressure and temperature level can be used for direct injection, higher-quality steam can be saved. This higher-quality steam is otherwise in general taken from the overflow line of a low-pressure turbine. The higher-quality steam that is saved is therefore available to the steam expansion process in the low-pressure section of the steam turbine, in order to generate electrical energy. This results in an increase in the overall efficiency of the fossil-fueled power station.

In addition to reducing the load on the heating device, by means of the condensation heat that is introduced, the desorption process is furthermore assisted by the method according to the invention in that the steam that is introduced reduces the partial pressure of the carbon dioxide that has already gassed-out. This means a decrease in the concentration of carbon dioxide in the gas phase, thus assisting the process of forcing out the carbon dioxide which is bound in the loaded absorption medium. Less absorption medium therefore need be vaporized, as a result of which less heat need be introduced into the desorption process by the heating device. Since the heating device is likewise operated by steam, this reduces the steam consumption. The steam that is saved is therefore available to the power-station process, and can contribute to increasing the overall efficiency.

According to the invention, the method results in only a portion of the required amount of heat for thermally forcing out the carbon dioxide being introduced from the loaded absorption medium. A further portion of the required heat energy is introduced by the heating device, and primarily indirectly via a heat exchange process, into the desorption process. The energy which is required to force the carbon dioxide out of the loaded absorption medium can therefore be significantly reduced. In consequence, the energy that is saved is available to the power-station process, thus considerably increasing the efficiency of the power station.

The method for separation of carbon dioxide from an off-gas of a fossil-fueled power station therefore allows considerably more efficient operation, resulting from increased overall efficiency of the power station. This is achieved by saving energy for operation of the desorption process. Furthermore, the invention allows retrospective installation of a carbon-dioxide separation device, while satisfying economic conditions.

The amount of absorption medium which is extracted from the absorption medium circuit by the absorption/desorption process is advantageously compensated for approximately by the amount of injected steam. This is possible since water is introduced by the condensation of the steam in the desorption process. Since the absorption media that are used are in general water-soluble and losses of the absorption media occur in any case by vaporization during the process, the water that is introduced compensates for the loss of absorption medium in the absorber/desorber circuit. A make-up water flow is provided in conventional methods, in order to compensate for absorption media losses. The use of the method according to the invention makes it possible to save this.

In one preferred embodiment of the carbon-dioxide separation method, the steam that is supplied is injected into the desorption process at a plurality of points. This results in uniform distribution within the desorption process.

The steam for injection into the loaded absorption medium is preferably extracted from the steam/condensate circuit of the power-station process that precedes the separation process. This is possible since steam at a lower temperature can be used for injection into the loaded absorption medium. Steam such as this is at a temperature of about 100 and 120° C. However, in general, steam at a higher temperature is required for heating the heating process since heat is lost by the indirect heat transfer when using a heat exchanger. This high-energy steam is in contrast in general taken, for example, from the overflow line to the low-pressure section of a steam turbine. This steam is at temperatures of about 120 to 160° C.

Depending on the way in which the power-station process is operated or taking account of other parameters in the power-station process, the steam is advantageously extracted from a steam generation process which is not coupled to the electricity generation process of the power station. This reduces the load on the power-station process, as a result of which the efficiency of the power station is increased. This steam source may be a steam-generation process which, for example, is provided specifically for the separation process, or some other steam source which is otherwise provided permanently, for example for provision of process steam or hot steam.

Only a portion of the supplied steam is preferably injected into the loaded absorption medium. Another portion of the supplied steam exchanges heat with the loaded absorption medium. The steam which is provided for the desorption process is therefore split into two parallel steam flows. The splitting of the two steam flows is controlled by a control process.

In one advantageous development of the carbon-dioxide separation method, the steam that is supplied first of all exchanges heat with the loaded absorption medium, and a portion of the steam is then injected into the loaded absorption medium. This is advantageous when high-temperature steam is available in any case for operation of the separation process. The heat content of the steam is reduced by exchanging heat with the loaded absorption medium, and it is then, at least partially, injected into the desorption process.

According to the invention, the object relating to a fossil-fueled power station is achieved by a separation device, which is connected downstream from a combustion device, for separation of carbon dioxide from the off-gas which contains carbon dioxide, with the separation device having an absorption unit for absorption of gaseous carbon dioxide, and a desorption unit for emission of gaseous carbon dioxide, wherein the desorption unit has an injection device for steam, which injection device is connected to a steam line such that steam can be injected into the desorption unit during operation of the separation device.

In this case, the invention is based on the idea that the injection device can be used to inject steam directly into the desorption unit, with the steam condensing in the desorption unit and releasing condensation heat, as a result of which the condensation heat that is introduced makes it possible to thermally force carbon dioxide out of an absorption medium which is loaded with carbon dioxide.

The injection device comprises a steam line which passes through the desorption unit and preferably has an annular shape. It is also possible to arrange a plurality of annular lines at different heights within the desorption unit.

In one preferred refinement of the fossil-fueled power station, the injection device is arranged in the lower area of the desorption unit. In this case, the desorption unit comprises a column which is aligned along a vertical axis. The column has an inlet in the upper area, and an outlet in the lower area. During operation, loaded absorption medium can therefore be introduced in the upper area, and a regenerated absorption medium can be passed out in the lower area, thus resulting in loaded absorption medium flowing through the desorption unit. In this case, carbon dioxide is forced out of an absorption medium primarily thermally since this makes it possible to make use of heat energy which is provided in the power station. The desorption unit can also have a plurality of columns. Columns such as these are also known in this fours in the chemical industry and are used to separate substance mixtures by thermal methods. This is done by use of equilibrium states between different phases.

In the lower area of the desorption unit, an absorption medium which is loaded with carbon dioxide is in the liquid phase. The loaded absorption medium can be heated by means of a heating device, which is likewise arranged in the lower area of the desorption unit. The lower part of the desorption unit is also referred to as a sump. An arrangement of the nozzle arrangement as close as possible to the sump has an advantageous effect on the partial pressure of the carbon dioxide already dissolved on injection of a steam. The reduction in the partial pressure that can be achieved means a decrease in the concentration of carbon dioxide in the gas phase, thus assisting the process of forcing out the carbon dioxide which is bound in the loaded absorption medium. Less energy is therefore required to heat the heating device. If a heating device which can be heated using steam is used, then the amount of steam that is saved in the power station is available for generation of electrical energy, thus increasing the overall efficiency of the power station.

In one preferred refinement of the fossil-fueled power station, the injection device comprises a nozzle arrangement, which in turn has a number of nozzle heads. A number of nozzle heads are preferably distributed over the nozzle arrangement, thus making it possible to introduce steam, which can be introduced through the nozzles, uniformly into the desorption unit. In this case, the nozzle heads are preferably aligned in the flow direction of the loaded absorption medium. This prevents undesirable flows and ensures specific injection of steam into the desorption unit, with this preferably being done uniformly.

The injection device is expediently connected via the steam line to the bleed point on an overflow line or on a steam/condensate line of a steam turbine installation. The choice of the steam extraction point, to which the injection device is connected via the steam line, is defined as a function of the required and available steam parameters. Steam which is intended for injection into the desorption unit must in this case have parameters (pressure and temperature) which are above the condensation point. The steam is preferably taken from the steam/condensate line which connects the low-pressure stage of the steam turbine to the condenser. The steam which is carried in the steam/condensate line is in this case at temperatures of about 100 to 120° C.

In one particular development of the fossil-fueled power station, the desorption unit comprises a heating device which can be heated by steam and is connected to the injection device via a steam line, such that steam can be passed from the heating device to the injection device, and can be injected into the desorption unit. This arrangement requires the use of steam at a higher temperature, which can preferably be taken from the overflow line between the medium-pressure section and the low-pressure section of a steam turbine. First of all, this steam drives the heating device by exchanging heat between the steam and the loaded absorption medium. This reduces the temperature of the steam. This steam at a lower temperature can now be supplied to the injection device through the steam line which connects the heating device to the injection device, and can be injected into the desorption unit via the injection device.

Further advantages of the fossil-fueled power station result analogously from the corresponding developments of the carbon-dioxide separation method described above.

BRIEF DESCRIPTION OF THE DRAWINGS

Exemplary embodiments of the invention will be explained in more detail in the following text with reference to schematic drawings, in which.

DETAILED DESCRIPTION OF INVENTION

Figure 1:
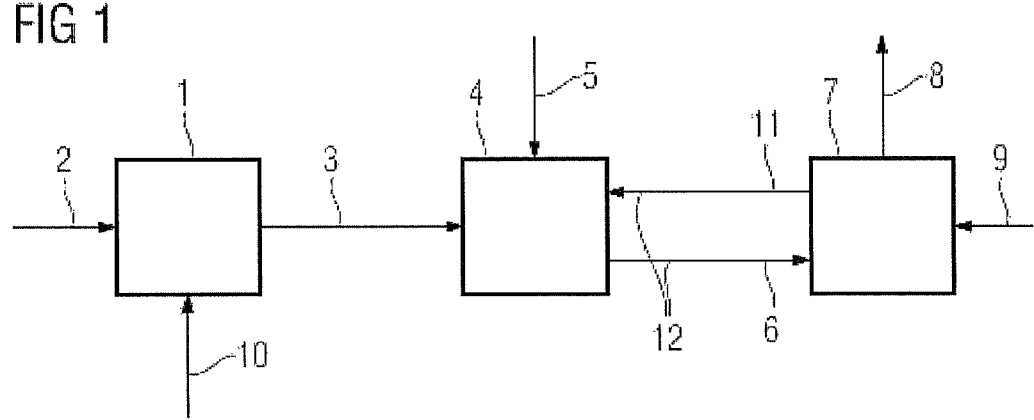
FIG. 1 shows one exemplary embodiment of a carbon-dioxide separation method.

FIG. 1 shows one exemplary embodiment of a carbon-dioxide separation method, and in particular the injection of steam 9 into the desorption process 7. The method essentially comprises a combustion process 1, an absorption process 4 and a desorption process 7.

In the combustion process 1, an off-gas 3 which contains carbon dioxide is produced, and from which the carbon dioxide is intended to be removed by the carbon-dioxide separation method. For this purpose, the off-gas 3 that contains carbon dioxide is supplied to the absorption process 4. An absorption medium 5 is also supplied to the absorption process. In the absorption process 4, the off-gas 3 that contains carbon dioxide comes into contact with the absorption medium 5, as a result of which carbon dioxide is absorbed by the absorption medium 5, and a loaded absorption medium 6 and an off-gas from which carbon-dioxide has largely been removed are formed.

The loaded absorption medium 6 is passed to the desorption process 7, where it is regenerated. Steam 9 is now injected into the desorption process for regeneration. This steam condenses to form water and in the process releases condensation heat. This condensation heat assists the regeneration process. The regeneration process results in a regenerated absorption medium 11 and a gas/vapor mixture comprising gaseous carbon dioxide 8 and absorption medium in the form of vapor. The gas/vapor mixture is separated by a separation process into condensed absorption medium and gaseous carbon dioxide 8. The figure does not show the feedback of the condensed absorption medium into the circuit of the absorption medium 5. The gaseous carbon dioxide 8 can now be passed to a compressor process, where it is liquefied for further processing or for transport.

Figure 2:
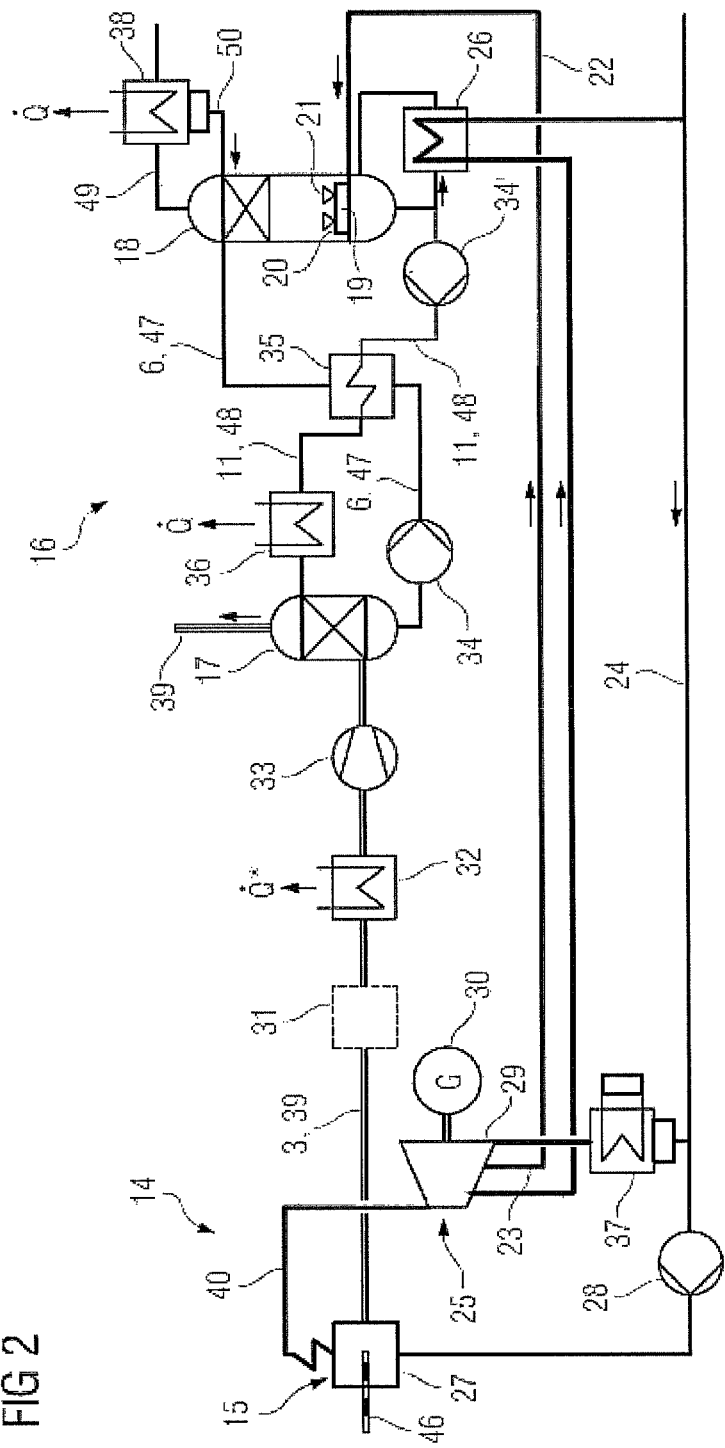
FIG. 2 shows one exemplary embodiment of a fossil-fueled power station having a steam turbine installation and a carbon-dioxide separation apparatus.

FIG. 2 shows one exemplary embodiment of a fossil-fueled power station 14, comprising a steam turbine installation 25 and a separation apparatus 16 for carbon dioxide.

The steam turbine installation 15 is preceded by a combustion device 15. The combustion device 15 comprises a fired boiler 27, to which a fossil fuel can be supplied via a fuel supply line 46. The fuel which can be supplied is burnt in the fired boiler 27, with an off-gas 3, which contains carbon dioxide, and steam being produced. The fired boiler 27 is connected to a steam turbine 29 of the steam turbine installation 25 via a steam line 40. The steam turbine 29 can be driven by the steam that is supplied. The steam turbine 29 in turn drives a generator 30, in order to generate electricity, via a shaft. The steam leaving the steam turbine 29 is supplied to the condenser 37 via a line. In order to feed back condensed steam, the condenser 37 is in turn connected via a steam/condensate line 24 to the fired boiler 27. A condensate pump 28 is connected in the steam/condensate line 24, in order to feed the condensate.

The off-gas 3 which contains carbon dioxide leaves the fired boiler, and can be supplied via a flue-gas line 39 to the absorption unit 17, which comprises the separation device 16. A flue-gas cleaning system 31, a flue-gas cooler 32 and a fan 33 are connected in the flue-gas line 39. The flue-gas cleaning system 31 may, for example, comprise a desulfurization installation or other systems for cleaning the flue gas. Heat is taken from the off-gas 3, which contains carbon dioxide, by means of the flue-gas cooler 32. The need for flue-gas cooling is in this case dependent on the required temperature level in the absorption unit. The flue-gas cleaning system 31, the flue-gas cooler 32 and the fan are optional, and can also be arranged in a different sequence.

The separation device 16 essentially comprises an absorption unit 17 and a desorption unit 18. The absorption unit 17 may comprise a plurality of columns, which in turn are provided with fittings, so-called packings. The packings are used to enlarge the surface area, which is advantageous for the absorption of the carbon dioxide from the off-gas into the absorption medium. In addition to the off-gas 3 which contains carbon dioxide, the absorption unit 17 can be supplied with an absorption medium via a line for regenerated absorption medium 48. The off-gas can be cleaned by passing the off-gas 3, which contains carbon dioxide, and the absorption medium through this, as a result of which an off-gas from which carbon dioxide has largely been removed can be passed out via a flue-gas line 39. A loaded absorption medium 6 which is created by the cleaning process in the absorption unit 17 can be supplied to the desorption unit, via a line for loaded absorption medium 47.

An absorption medium pump 34 and a cross-flow heat exchanger 35 are connected in the line for the loaded absorption medium 47. The absorption medium pump 34 is used to feed the loaded absorption medium 6. The loaded absorption medium can be passed to the cross-flow heat exchanger 35 in the opposite direction to a hot regenerated absorption medium 11. This makes it possible to preheat the loaded absorption medium 6.

The desorption unit 18 may comprise a plurality of columns which are in turn provided with fittings, so-called packings. The packings are used to enlarge the surface area, which is advantageous for the desorption of loaded absorption medium 7. The desorption unit furthermore comprises an injection device 19, which is arranged in the lower area of the desorption unit 18. The injection device 19 comprises a line through which steam can be passed, and a nozzle arrangement 20 which has a number of nozzle heads 21, through which steam which can be passed through the injection device 19 can be injected into the desorption unit 17. The injection process preferably takes place in the flow direction of the absorption medium, that is to say from top to bottom. The injection device 19 is connected via a steam line 22 to a bleed point of an overflow line 23 from the steam turbine 29. In this case, the figure does not show an alternative steam line, which connects the injection device 19 to the steam/condensate line 24. It is likewise possible to take steam to be supplied into the injection device 19 from another steam line.

A large amount of carbon dioxide is emitted from the loaded absorption medium 6 in the desorption unit 18, thus forming a gaseous carbon dioxide 8 and the regenerated absorption medium 11. A portion of the regenerated absorption medium 11 leaving the desorption unit 18 is heated via a heating device 26, and is once again supplied to the desorption unit 18. In this case, a reboiler is used as the heating device. Another portion of the regenerated absorption medium 11 leaving the desorption unit 18 is supplied to the absorption unit 17 via a line for regenerated absorption medium 48. An absorption medium pump 34', the cross-flow heat exchanger 35 and an absorption medium cooler 36 are connected in the line for regenerated absorption medium 48. The cross-flow heat exchanger 35 and the absorption medium cooler 36 make it possible to extract heat from the regenerated absorption medium. The use of the absorption medium cooler 36 is optional.

Furthermore, the desorption unit 18 is connected to a separation apparatus 38 via a gas line 49. The absorption medium, in the form of vapor, and gaseous carbon dioxide are separated by condensation of the absorption medium in the separation apparatus, the so-called stripper condenser. The condensed absorption medium can be supplied to the desorption unit 18 via a condensate line 50. The gaseous carbon dioxide is now available for further processing, for example liquefaction.

Figure 3:
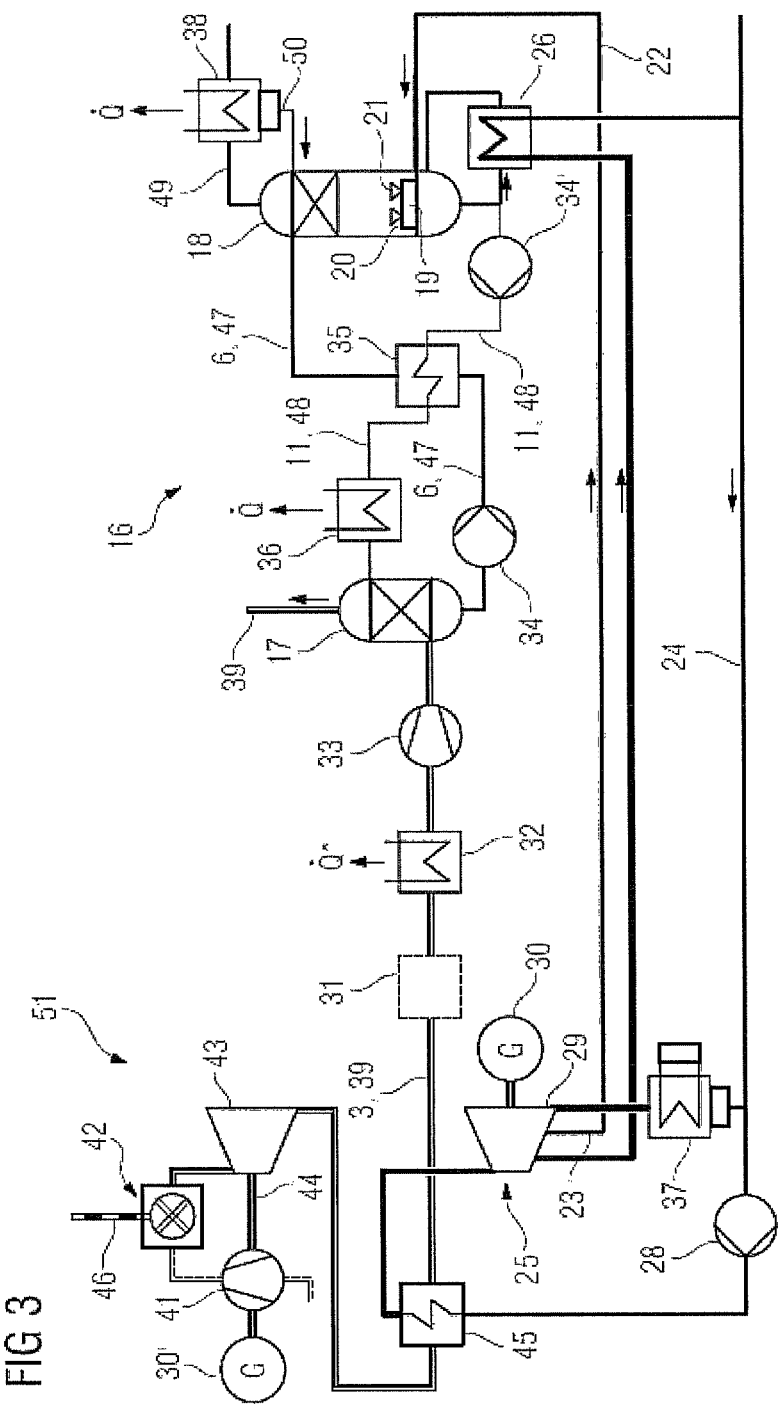
FIG. 3 shows one exemplary embodiment of a fossil-fueled power station having a gas-turbine and steam-turbine installation and a carbon-dioxide separation apparatus.

The fossil-fueled power station 14 illustrated in FIG. 3 shows a gas-turbine and steam-turbine power station 51 having a separation device 16 for carbon dioxide. The gas-turbine and steam-turbine power station 51 is preceded by the separation device 16. The gas-turbine and steam-turbine power station 51 comprises a gas-turbine unit and a steam-turbine unit. The gas-turbine unit essentially comprises a gas turbine 43, which is connected via a shaft to an air compressor 41 and a generator 30. The air compressor 41 is connected to the combustion chamber 42. The combustion chamber 42 is likewise connected to a fuel supply line 46. An off-gas which contains carbon dioxide and results from a combustion process can be supplied to the gas turbine 43 via a flue-gas line. An off-gas which contains carbon dioxide and leaves the gas turbine 43 can be passed via a flue-gas line to the steam-turbine unit. The steam-turbine unit comprises the waste-heat steam generator 45, a steam turbine 29, a generator 30 and a condenser 37. The flue-gas line is connected to the waste-heat steam generator 45 of the steam-turbine unit. The waste-heat steam generator 45 is intended for steam generation and supplies the steam turbine 39 with steam via a steam line. The steam turbine 39 is connected via a shaft to a generator 30 for electricity generation. The downstream separation apparatus 16 is designed essentially analogously to the steam power station in FIG. 2.

The invention allows high-efficiency operation of a power station with reduced carbon-dioxide emissions. The direct injection of steam into the desorption unit reduces the load on the sump vaporizer and saves higher-quality steam at the expense of supplying low-quality steam. This saves energy for operation of the desorption process. The apparatus for separation of carbon dioxide from an off-gas which contains carbon dioxide is a component of the fossil-fueled power station. The improvement in the circuitry makes it possible to achieve a significant increase in the efficiency in comparison to a conventional gas cleaning device of a fossil-fueled power station.

The invention claimed is:

1. A method for separation of carbon dioxide from a flue gas of a fossil-fueled power station, comprising:
    burning a fossil fuel in a combustion process coupled to a generator to provide a source of electric power, the combustion process producing a hot off-gas comprising carbon dioxide;
    bringing the hot off-gas comprising carbon dioxide into contact with an absorption medium in an absorption process where carbon dioxide is absorbed by the absorption medium forming a loaded absorption medium;
    thermally forcing out gaseous carbon dioxide of the loaded absorption medium in a desorption process and extracting a portion of the absorption medium from the loaded absorption medium;
    injecting a supply of steam into the loaded absorption medium, with the condensation heat released by condensation of the steam being transferred to the loaded absorption medium, wherein the steam supply injected into the loaded absorption medium is extracted from a steam generator process which is not coupled to the same combustion process or the generator of the power station which provides the source of electric power, and wherein the steam is injected into the desorption process at a plurality of points.

2. The method as claimed in claim 1, wherein a first amount of absorption medium which is extracted from the loaded absorption medium by the absorption process/desorption process is compensated for approximately by a second amount of injected steam.

3. The method as claimed in claim 1, wherein the steam for injection is extracted from a steam/condensate circuit of a fossil-fueled power station.

4. The method as claimed in claim 1,
wherein only a first portion of the supplied steam is injected into the loaded absorption medium, and
wherein a second portion of the supplied steam exchanges heat with the loaded absorption medium.

5. The method as claimed in claim 1,
wherein the steam that is supplied exchanges heat with the loaded absorption medium, wherein steam whose heat content has been reduced is formed, and
wherein a third portion of the steam whose steam content has been reduced is injected into the loaded absorption medium.

* * * * *